Figure 1:
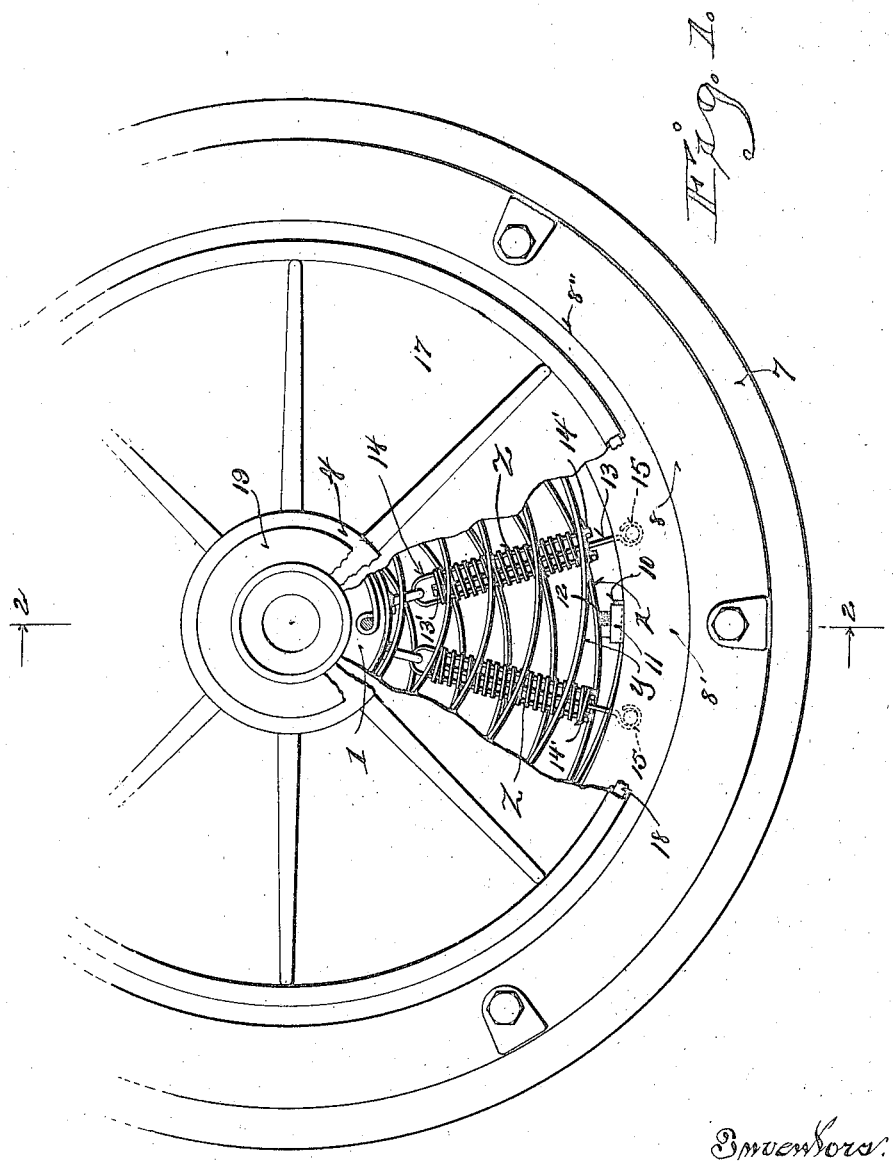

Mar. 20, 1923.

J. A. BRADLEY ET AL.
SPRING WHEEL.
FILED NOV. 10, 1920.

1,449,213.

2 SHEETS—SHEET 1.

Inventors:
Jacob A. Bradley
Frank P. Booz

Mar. 20, 1923.

J. A. BRADLEY ET AL.
SPRING WHEEL.
FILED NOV. 10, 1920.

1,449,213.

2 SHEETS—SHEET 2.

Inventors
Jacob A. Bradley
Frank P. Booz

Witness
R. C. Weber

Patented Mar. 20, 1923.

1,449,213

UNITED STATES PATENT OFFICE.

JACOB A. BRADLEY AND FRANK P. BOOZ, OF MILWAUKEE, WISCONSIN.

SPRING WHEEL.

Application filed November 10, 1920. Serial No. 423,137.

*To all whom it may concern:*

Be it known that JACOB A. BRADLEY and FRANK P. BOOZ, both citizens of the United States, and residents of Milwaukee, in the county of Milwaukee and State of Wisconsin, have invented certain new and useful Improvements in Spring Wheels; and we do hereby declare that the following is a full, clear, and exact description thereof.

Our invention has for its object to provide a simple, economical and durable spring wheel of that general construction, such as is disclosed in Patent No. 1,323,005 issued to J. A. Bradley November 25, 1919.

Specific objects of our invention are:

To provide a group of right spirally wound springs and a corresponding group of left spirally wound springs, the individual springs of each group being connected to a hub and rim and each group being spaced apart from the middle of the hub to form a clearance for auxiliary compression springs, which are radially disposed and connected to the hub and rim.

Another object is to provide a peculiar construction of hub and spacing collars, whereby a practical wheel is produced and assemblage is facilitated.

Another object is to provide means in connection with the hub and rim, whereby a series of encasing discs are rigidly secured to the hub, and in frictional engagement with the rim so as to render the several pairs of nested springs dust-proof, and to insure lubrication of the sets of springs.

With the above and other objects in view, the invention consists in certain peculiarities of construction and combination of parts, as are hereinafter set forth with reference to the accompanying drawings and subsequently claimed.

Figure 2:
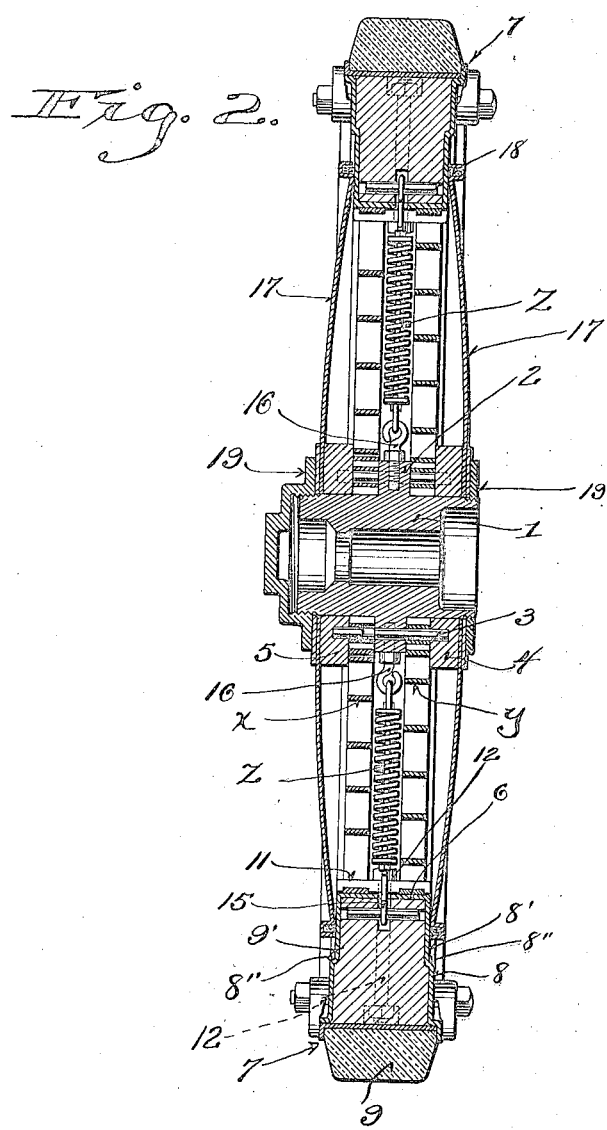

In the drawings,

Figure 1 represents a fragmentary face view of a wheel embodying the features of our invention, with parts broken away, to more clearly illustrate the details of construction, and Figure 2 is a cross section of the same, the section being indicated by line 2—2 of Figure 1.

Referring by characters to the drawings, 1 represents a hub having an integral central collar 2, extending therefrom, which collar is apertured at regular intervals throughout its circumference for the reception of a uniform series of anchor pins 3. The outer ends of the anchor pins are fitted into sockets formed upon the inner faces of a pair of outer collars 4, 5. The outer collars are fitted to the hub ends and are separable therefrom. The inner faces of the collars are spaced a predetermined distance from the opposite faces of the central collar 2 for the reception of the inner ends of spirally coiled groups of springs $x$, $y$. The inner ends of each spring of the two groups are coiled about the anchor pins 3 and they spiral outwardly to the inner circular face 6 of a rim 7. The filler of the rim is preferably composed of wood and it is encased in a metallic shell 8, which forms the inner circular face 6 and outer rub plate faces 8′, which faces terminate with shoulders 8″. The rim is also provided with the usual tread 9 and suitable means for securely holding it.

The outer ends of the spirally wound springs $x$, $y$, as best shown in Figure 1, rest upon the face 6 of the rim and are formed with upturned terminal lips 10. Each outer spring end, together with its companion spring end of the opposite series, for assembling, is clamped to the inner face of the rim by a clip 11, which is best shown in Figure 2, and which is formed with recesses adapted to nest over the springs transversely, whereby they are securely clipped and held in place laterally. The clips which confine the outer ends of the springs are each held in place by a suitable bolt 12 that passes through the wood rim filler, and is secured by a suitable nut in such manner that the clips can be drawn tightly to their various seats.

The wheel is also provided with a series of radially disposed coil springs $z$, which are positioned between the groups of springs $x$, $y$. These springs are of the compression type, each of which, as best shown in Figure 1 is provided with a central pull-rod 13 and a yoke pull-rod 14. The yoke pull-rod has outer parallel stretches which are connected by a cross-head 14′. The central pull-rod, at its inner end is provided with a cross-head 13'. The coil springs 2 are thus wound about the pull-rods and their inner and outer coils seat upon the cross-heads 13' and 14'. As best shown in Figure 2, the pull-rod 13 of each spring is formed with an eye which enters a slot in the rim and is engaged by a cross-pin 15 to thus secure this element of the compression spring. The cross-pins 15 are fitted through transverse apertures in the rim filler, and after they have been assembled, the rim shell is pressed into shape over these apertures, whereby they are closed by the side faces of the shell 8'.

The double or yoke pull-rods 14 at their inner ends are formed with loops, which loops engage heads of screw eyes 16. The shanks of these screw eyes are in threaded union with the central collar 2 of the hub, and due to this threaded connection a certain amount of adjustability as to the tension of the coil springs 2 may be had.

In order to render the various spring elements dust-proof and to facilitate packing same in grease, if desired, we provide casing discs 17. The inner faces of these discs are fitted against the outer faces of the hub collars 4 and 5 and said discs are preferably dished inwardly from the hub, so as to add strength to them. The outer annular edges of the discs are formed with annular grooves for the reception of packing rings 18, which rings engage the surfaces 8' of the rim members to thus form a practically dust-proof joint between the rim and casing discs, it being understood that when the wheel is in action there is a predetermined play of the rim with respect to the discs. The discs are rigidly held to the hub by means of washers and binder rings 19, which binder rings are in threaded union with the hub ends.

Attention is also directed to the fact that at least one of the hub collars is fast to the hub for the purpose of practical assemblage and strength, and that the other two collars are removable. Hence, in the construction shown wherein the central collar is a part of the hub, it will be observed that the other collars are held against rotary motion by the anchor pins 3, and furthermore, owing to the binder rings, after the parts are assembled, all of the elements are frictionally drawn together so as to make a tightly running wheel, which wheel while capable of all the resiliency required to sustain the load strain, is absolutely rigid transversely to guard against dishing, which dishing is a common fault, in practice, of spring wheels.

While we have shown and described all of the structure in detail, it is understood that variations as to mechanical equivalents shall be within the scope of our invention.

We claim:

1. A spring wheel having a hub, a rim member and two series of spirally coiled springs extended from the hub to the rim, the two series being upon different planes to form a central space therebetween and coiled in opposite directions, and means for attaching the inner and outer ends of the springs of each series to the hub and rim respectively, a central collar and a pair of outer spacing collars carried by the hub for confining the inner ends of the springs, inner and outer casing discs fitted to the exterior faces of the outer hub collars, the outer annular edges of the discs being in frictional engagement with the side faces of the rim, binder rings for the discs in threaded union with the opposite hub ends and radially disposing the compression coil springs, having oppositely movable drawrods connecting said rim and hub, the same being positioned in the space between the spirally coiled springs.

2. A spring wheel comprising a hub, having a central collar, a series of anchor pins extending through the collar, spirally coiled springs having their ends secured to the anchor pins upon opposite sides of the central collar, clips carried by the rim member for securing the outer end of the spirally coiled springs to the rim, a series of pull-rods connected to the fixed hub collar, a series of similar pull-rods connected to the rim, each pull-rod being provided with a cross-head, coil springs in position between the cross-heads and surrounding the pull-rods and encasing discs carried by the hub and in frictional engagement with the inner and outer side faces of the rim.

3. A spring wheel having a hub with a centrally disposed collar, a series of anchor pins disposed at predetermined distance about the collar, two series of oppositely coiled spiral springs having their inner ends connected to the anchor pins, means for securing the outer end of each spring of the two series to the inner face of the rim, coil springs positioned between the two sets of spirally wound springs, means connecting the ends of the coil springs with the rim and hub collar, collars mounted upon the hub engageable with the inner terminals of the spirally wound sets of springs, and a pair of outwardly dished discs secured to the collars, having their annular outer edges in frictional engagement with the side faces of the rim.

4. A spring wheel having a hub, a rim and a spiral spring coiled about said hub and extending to said rim, a second spiral spring coiled in an opposite direction from said first mentioned spiral spring and spaced therefrom, and a series of radially disposed compression coil springs interposed between said spiral springs and connected directly to said hub and said rim.

5. In a device of the class described, the combination of a rim filler, a metallic shell covering said rim filler, a hub, a pair of spiral springs coiled about said hub, a clip having two substantially alined recesses therein for the reception of the ends of said springs, said clip having a central aperture therethrough, an opening through said rim filler and said shell, and a bolt extending through said opening and said aperture and binding said clip to said shell.

In testimony that we claim the foregoing we have hereunto set our hands at Milwaukee, in the county of Milwaukee and State of Wisconsin.

JACOB A. BRADLEY.
FRANK P. BOOZ.